(12) United States Patent
Torii

(10) Patent No.: US 11,624,478 B2
(45) Date of Patent: Apr. 11, 2023

(54) HEAD MOUNTED DEVICE

(71) Applicant: CANON KABUSHIKI KAISHA, Tokyo (JP)

(72) Inventor: Takashi Torii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 144 days.

(21) Appl. No.: 17/160,075

(22) Filed: Jan. 27, 2021

(65) Prior Publication Data

US 2021/0239265 A1 Aug. 5, 2021

(30) Foreign Application Priority Data

Jan. 30, 2020 (JP) .............................. JP2020-014022

(51) Int. Cl.
*F16M 13/04* (2006.01)
*G06F 1/16* (2006.01)

(52) U.S. Cl.
CPC ............. *F16M 13/04* (2013.01); *G06F 1/163* (2013.01)

(58) Field of Classification Search
CPC ........ F16M 13/04; G06F 1/163; G02B 27/017
See application file for complete search history.

(56) References Cited

U.S. PATENT DOCUMENTS

| 10,251,289 | B2 | 4/2019 | Chen et al. |
| 2002/0196300 | A1* | 12/2002 | Takahashi ............. B41J 13/106 347/14 |
| 2019/0037715 | A1* | 1/2019 | Chen ................. G02B 27/0176 |

FOREIGN PATENT DOCUMENTS

JP 6529288 B2 6/2019

* cited by examiner

*Primary Examiner* — Mark Edwards
*Assistant Examiner* — Chayce R Bibbee
(74) *Attorney, Agent, or Firm* — Canon U.S.A., Inc. IP Division

(57) ABSTRACT

A head mounted device includes a ring-shaped mount unit for mounting the head mounted device on a head of a user, the ring-shaped mount unit including a first housing having a band portion on each of both sides thereof and a second housing having an engagement portion to be engaged with the band portion, and the ring-shaped mount unit being formed in a ring shape that enables enlargement and reduction of a circumference thereof by engagement of the band portion with the engagement portion. The head mounted device further includes a circumference holding unit, such as a torque limiter, configured to generate a holding force at least in a circumference enlargement direction of the ring-shaped mount unit.

8 Claims, 9 Drawing Sheets

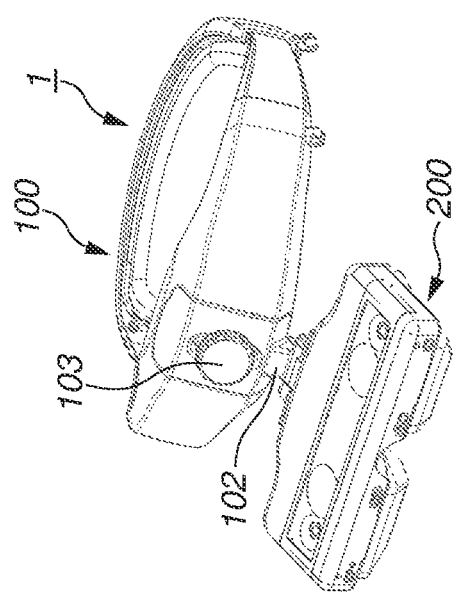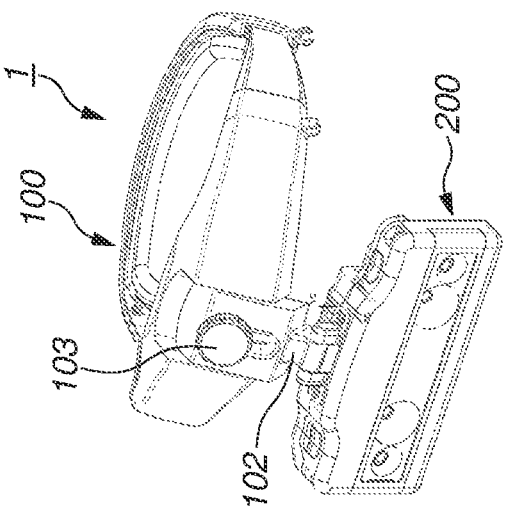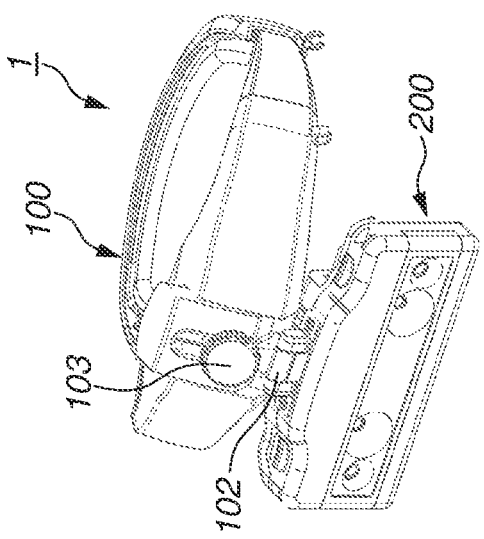

HEAD MOUNTED DEVICE

BACKGROUND

Field of the Disclosure

The present disclosure relates to a head mounted device including a ring-shaped mount unit for mounting the head mounted device on the head of a user.

Description of the Related Art

A head mounted display (HMD) is one type of a head mounted device that is mounted on the head of a user. The HMD is used as one of devices for experiencing virtual reality (VR) and augmented reality (AR).

The head mounted device includes a ring-shaped mount unit allowing the head mounted device to be mounted on the user's head, There is a demand that the head mounted device is easily mountable and demountable and that the mount unit is provided with a circumference variable mechanism to suit various head shapes.

Japanese Patent No. 6529288 discusses a configuration in which a mount unit has an outer belt and an inner belt, and part of the inner belt is inserted into the outer belt. A retention mechanism is provided to prevent the inner belt from moving in a direction where the inner belt is removed from the outer belt, and the retention can be released by performing a predetermined operation.

According to the configuration discussed in Japanese Patent No. 6529288, however, it is difficult to make a fine adjustment for slightly enlarging the circumference of the mount unit to weaken a holding force for holding the HMD on the user's head. The user may therefore feel inconvenience.

U.S. patent Ser. No. 10/251,289 discusses a circumference variable mechanism in which a rack and pinion is combined with a latching mechanism.

In U.S. patent Ser. No. 10/251,289, however, the circumference of a mount unit can be enlarged only by operating a dial, and a user needs to keep turning the dial to achieve the maximum circumference. The user may therefore feel inconvenience.

SUMMARY

The present disclosure is directed to an easy-to-use circumference variable mechanism of a mount unit.

According to an aspect of the present disclosure, a head mounted device includes a ring-shaped mount unit for mounting the head mounted device on a head of a user, the ring-shaped mount unit including a first housing having a band portion on each of both sides thereof and a second housing having an engagement portion to be engaged with the band portion, and the ring-shaped mount unit being formed in a ring shape that enables enlargement and reduction of a circumference thereof by engagement of the band portion with the engagement portion, and a circumference holding unit configured to generate a holding force at least in a circumference enlargement direction of the ring-shaped mount unit.

Further features of the present disclosure will become apparent from the following description of exemplary embodiments with reference to the attached drawings.

BRIEF DESCRIPTION OF THE DRAWINGS

FIGS. 2A, 2B, and 2C are diagrams each illustrating a state where a display unit is moved relative to a mount unit in the HMD according to one or more aspects of the present disclosure.

DESCRIPTION OF THE EMBODIMENTS

Exemplary embodiments of the present disclosure will be described below with reference to the attached drawings.

In each of the exemplary embodiments, a head mounted display (HMD) will be described as an example of a head mounted device to which the present disclosure is applied.

Figure 1:
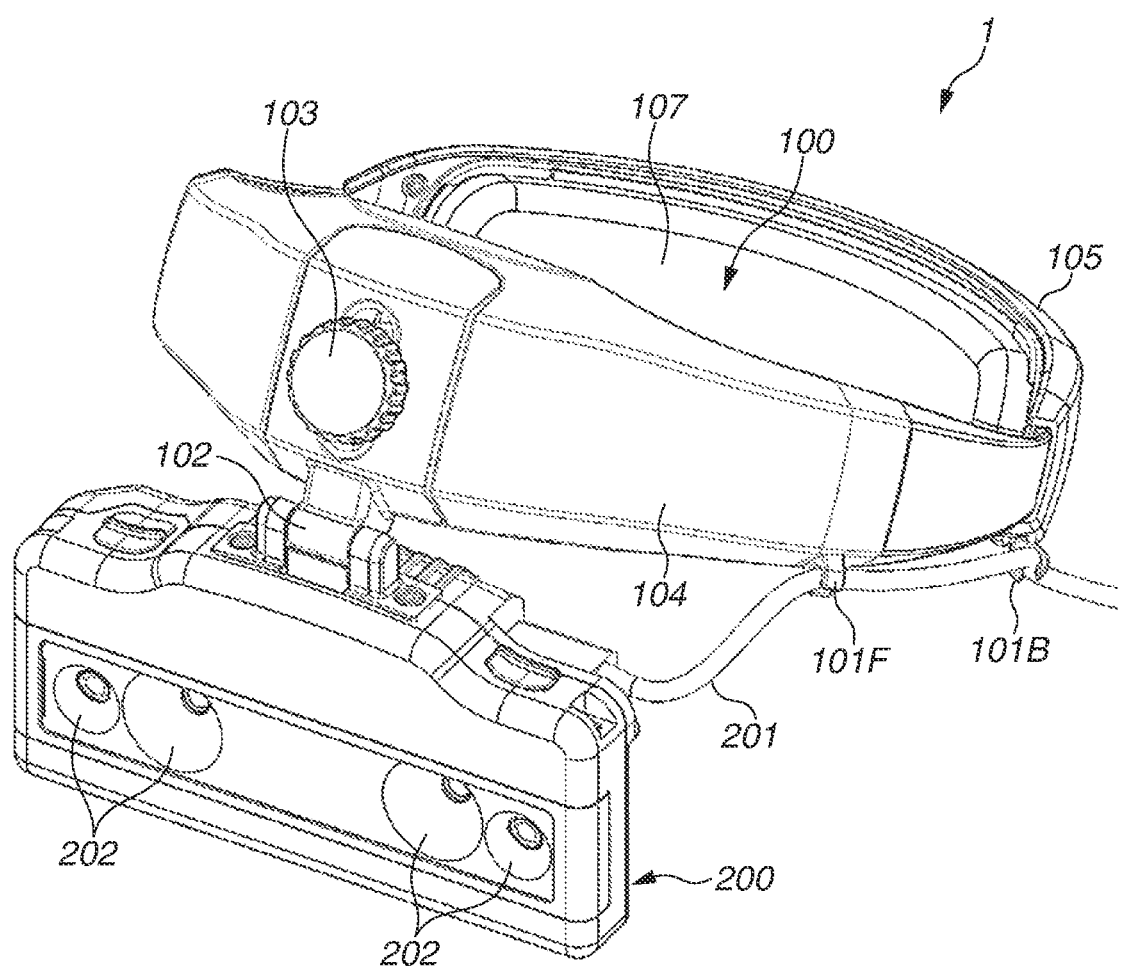
FIG. 1 is a perspective view of a head mounted display (HMD) according to one or more aspects of the present disclosure.

FIG. 1 is a perspective view of an HMD 1 according to a first exemplary embodiment. The HMD 1 includes a ring-shaped mount unit 100 for mounting the HMD 1 on the head of a user, and a display unit 200. In the following description, upward, downward, leftward, rightward, frontward, and rearward directions are defined based on a state where the user wears the HMD 1.

The mount unit 100 supports the display unit 200 at a front part thereof such that the display unit 200 hangs from the front part. The mount unit 100 includes cable guides 101B and 101F, and the cable guides 101B and 101F guide a cable 201 connected to the display unit 200 toward the back side of the user.

The display unit 200 guides light of an enlarged virtual image of a display element to the eyes of the user, using the display element and a display optical system. The user can thereby observe an image different from the real world in front of the eyes, and experience virtual reality (VR). An electroluminescent (EL) panel or a liquid crystal display (LCD) can be used for the display element, but the display element is not limited thereto.

The display unit 200 may further include a plurality of cameras 202 for imaging a field in front of the eyes of the user. An image formed by superimposing computer graphics (CG) image on a real image of the cameras 202 is displayed, so that the user can observe an augmented image of the real world onto which a CG image is superimposed and experience augmented reality (AR), Superimposing a CG image on a captured real image may be implemented by the display unit 200, or may be implemented by an external apparatus (not illustrated) connected via the cable 201.

The mount unit 100 supports the display unit 200 such that the display unit 200 can vertically shift, and the mount unit 100 includes a dial 103 for vertically shifting the display unit 200. Further, the mount unit 100 supports the display unit 200 such that the display unit 200 can tilt, via a rotation holding portion 102. FIGS. 2A, 2B, and 2C each illustrate a state where the display unit 200 is moved relative to the mount unit 100. FIG. 2A illustrates a state where the display unit 200 is shifted upward, and FIG. 2B illustrates a state where the display unit 200 is shifted downward. Further, FIG. 2C illustrates a state where the display unit 200 is tilted upward. In this way, the display unit 200 is movable relative to the mount unit 100, so that the HMD 1 can be easily used.

Next, a configuration of the mount unit 100 will be described in detail. The mount unit 100 includes a circumference variable mechanism that can enlarge and reduce the circumference of the mount unit 100, as will be described in detail below.

Figure 3:
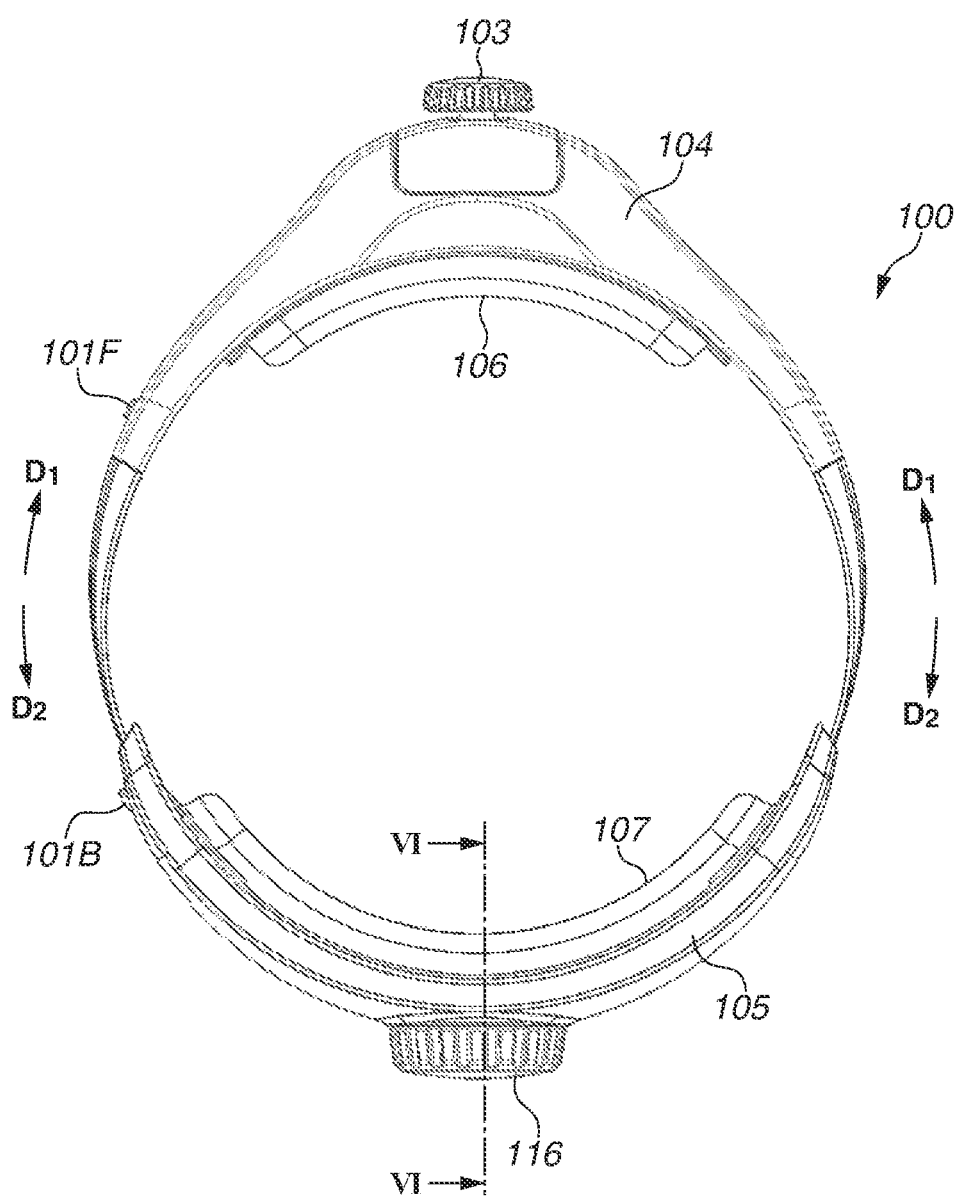
FIG. 3 is a plan view of the mount unit of the HMD according to one or more aspects of the present disclosure.

FIG. 3 is a plan view of the mount unit 100. A direction indicated by an arrow $D_1$ will be referred to as a circumference enlargement direction $D_1$ and a direction indicated by an arrow $D_2$ will be referred to as a circumference reduction direction $D_2$.

Figure 4:
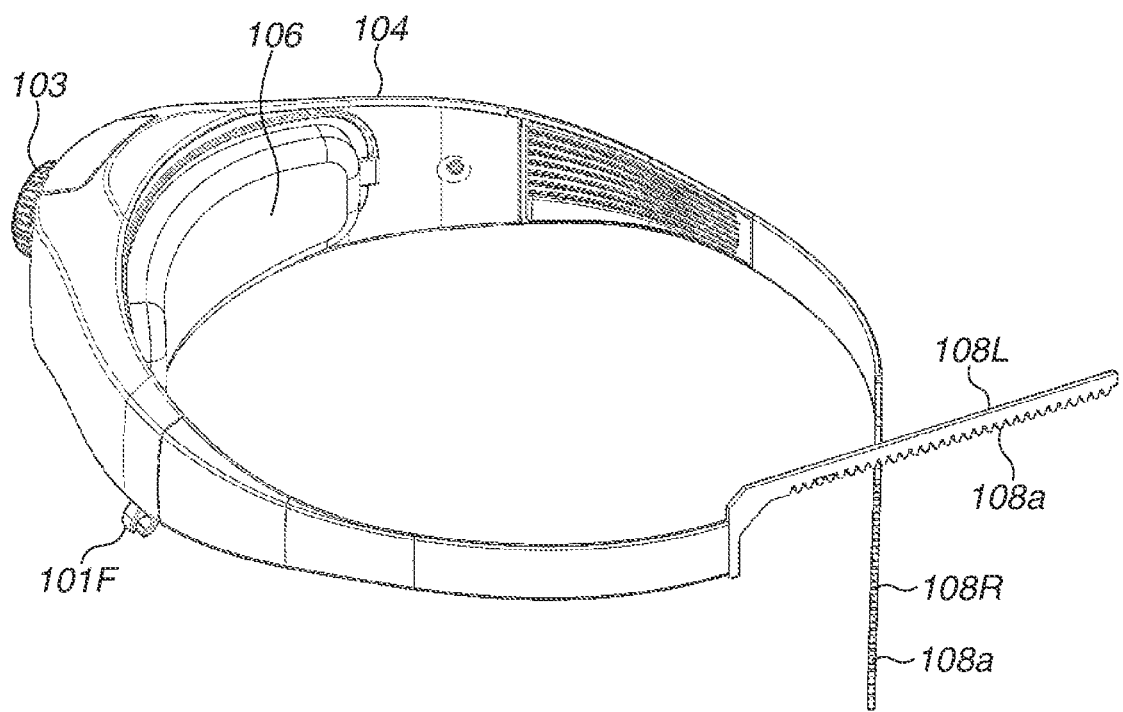
FIG. 4 is a perspective view of a first housing of the HMD according to one or more aspects of the present disclosure.
Figure 5:
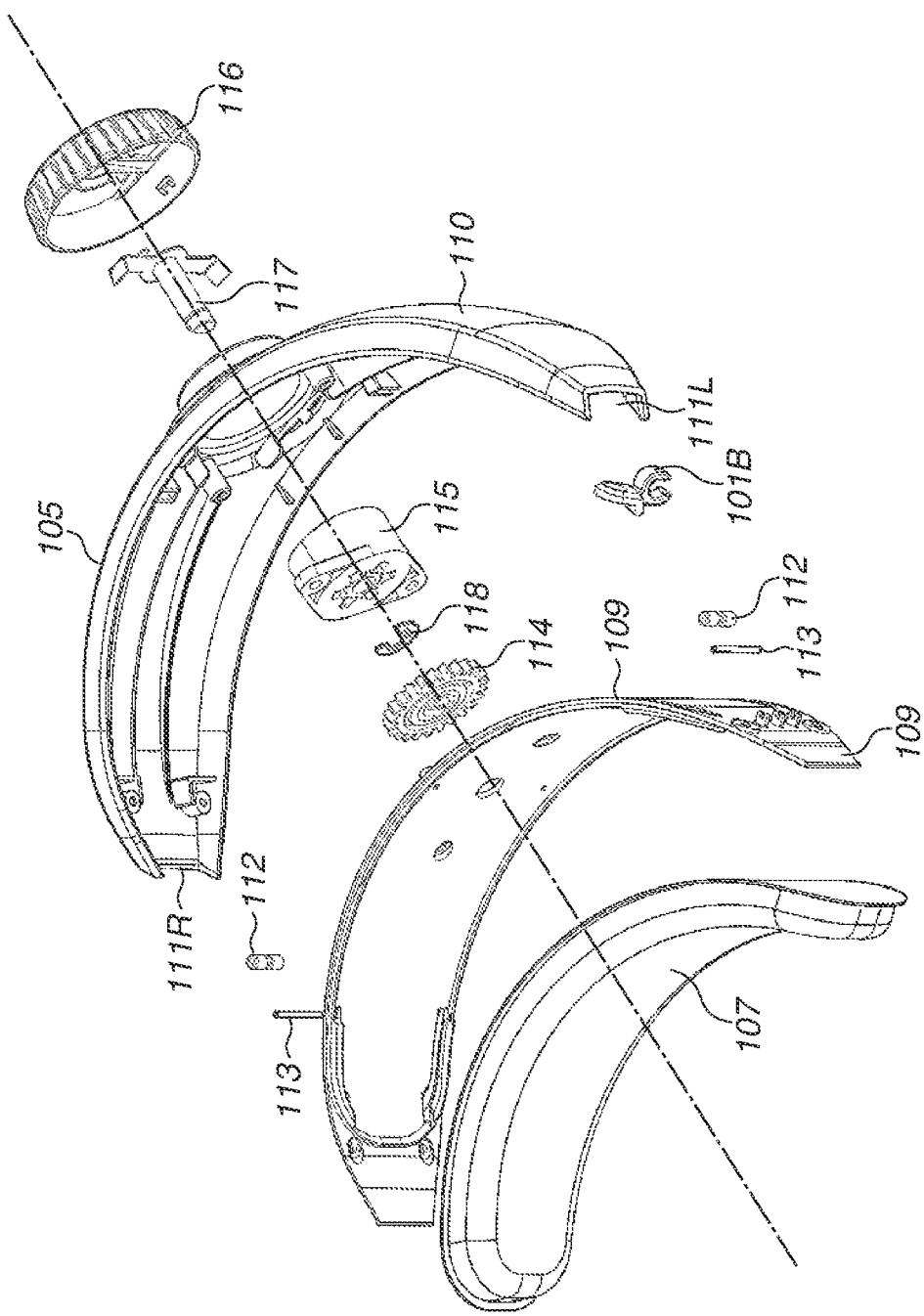
FIG. 5 is an exploded perspective view of a second housing of the HMD according to one or more aspects of the present disclosure.

As illustrated in FIG. 3, the mount unit 100 is configured to have a ring shape by combining a first housing 104 forming a front part and side parts and a second housing 105 forming a rear part. FIG. 4 is a perspective view of the first housing 104. FIG. 5 is an exploded perspective view of the second housing 105.

An inner peripheral surface of the front part of the first housing 104 is provided with a head contact member 106, and an inner peripheral surface of the second housing 105 is provided with a head contact ember 107. The head contact members 106 and 107 are each formed of a material such as sponge. The head contact members 106 and 107 may each be covered with a material having a high frictional coefficient to increase a holding force for holding the HMD 1 on the head of a user. The front part and the rear part of the mount unit 100 have high rigidity not to follow the shape of user's head even if the circumference of the mount unit 100 changes. The mount unit 100 thus does not press the head at any part other than the head contact members 106 and 107, so that those parts that make the user feel uncomfortable by being touched or pressed can be avoided.

The first housing 104 is formed of a material such as resin that is molded into a curved belt shape, and includes band portions 108L and 108R extending at both sides; as illustrated in FIG. 1. The band portions 108L and 108R have flexibility, and each include a rack 108a, The band portions 108L and 108R are inserted into the second housing 105 from both sides thereof so that the rack 108a engage with a pinion 114 in the second housing 105.

As illustrated in FIG. 5, the second housing 105 includes an inner portion 109 forming the inner peripheral surface side and an outer portion 110 forming the outer peripheral surface side. The inner portion 109 and outer portion 110 are each formed of a material such as a resin that is molded into a curved belt shape. Openings 111L and 111R are provided on both sides of the second housing 105, and the band portions 108L and 108R of the first housing 104 can be inserted into the openings 111L and 111R, respectively.

A pair of right and left rollers 112, a pair of right and left shafts 113, the pinion 114, and a torque limiter 115 are arranged between the inner portion 109 and the outer portion 110.

The roller 112 and the shaft 113 are attached to both right and left sides of the inner portion 109 and rotate to cause rolling resistance to the band portions 108L and 108R inserted into the openings 111L and 111R.

The pinion 114 and the torque limiter 115 are coaxially arranged at a central part of the second housing 105. The pinion 114 engages with the rack 108a of each of the band portions 108L and 108R respectively inserted into the openings 111L and 111R. In the present exemplary embodiment, the pinion 114 corresponds to an engagement portion in the present disclosure.

The outer portion 110 is provided with a dial-type operation member 116. The operation member 116 is provided with a pinion shaft 117 inserted into the torque limiter 115 and is connected to the pinion 114 to integrally rotate therewith. A ring 118 for retention is attached to the pinion shaft 117 between the pinion 114 and the torque limiter 115, and prevents the pinion shaft 117 from moving in an axial direction.

Figure 6:
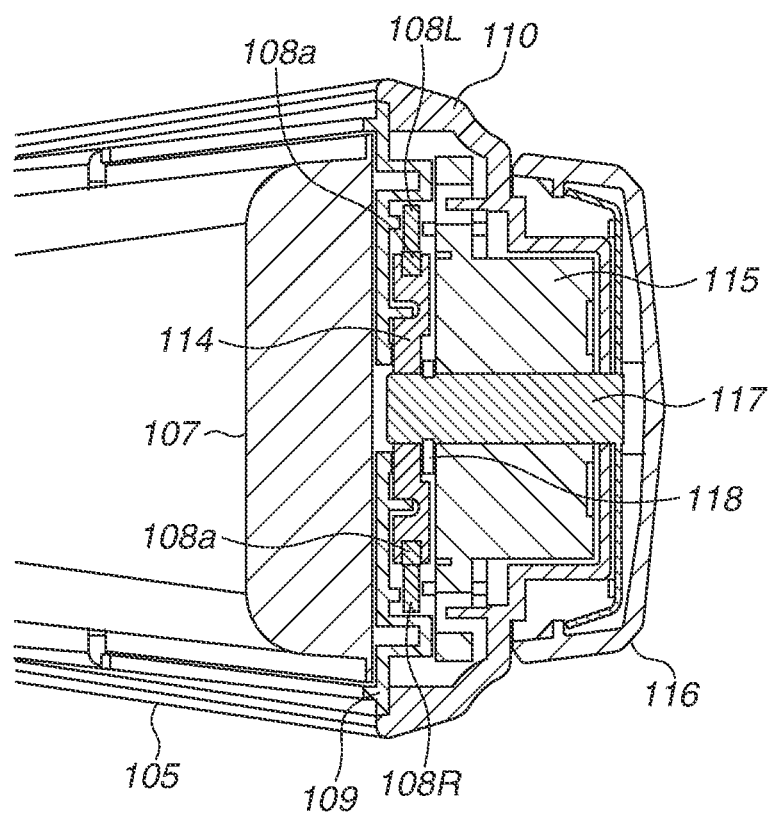
FIG. 6 is a diagram illustrating a cross-sectional configuration of the mount unit of the HMD according to one or more aspects of the present disclosure.

FIG. 6 illustrates a cross-sectional configuration taken along a line VI-VI in FIG. 3. The rack 108a of the band portion 108L is engaged with an upper part of the pinion 114, and the rack 108a of the band portion 108R is engaged with a lower part of the pinion 114. The mount unit 100 is thus formed in a ring shape allowing enlargement and reduction of the circumferential length thereof. For example, the user holds one of the first housing 104 and the second housing 105 by the hand and performs an operation (hereinafter referred to as "operation A") of applying a force to the other to enlarge or reduce the circumference of the mount unit 100. Performing the operation A causes the racks 108a of the band portions 108L and 108R to generate torque for rotating the pinion 114, so that the circumference of the mount unit 100 changes.

Here, the torque limiter 115 generates holding torque using a static frictional force with respect to the pinion shaft 117 and generates a holding force against a change in the circumference of the mount unit 100 up to the holding torque generated at the time of the maximum static frictional force. Performing the operation A with a force exceeding the maximum static frictional force causes the racks 108a of the band portions 108L and 108R to generate the torque for rotating the pinion 114 as described above, and the pinion 114 and the pinion shaft 117 thereby rotate, so that the circumference of the mount unit 100 changes. The operation A enables rough adjustment and fine adjustment to the circumference of the mount unit 100 in the both directions (i.e., the circumference enlargement direction $D_1$ and the circumference reduction direction $D_2$).

Next, operation of mounting and demounting the HMD 1 will be described.

When the user wears the HMD 1 on the head, the user performs the operation A to enlarge the circumference of the mount unit 100 to, for example, the maximum circumference and insert the head into the mount unit 100, Subsequently, the user performs the operation A to reduce the circumference of the mount unit 100 until the circumference substantially coincides with the circumference of the head. In a case where the user wants to make fine adjustment of the holding force for holding the HMD 1 on the head, the user may perform the operation A to slightly enlarge or reduce the circumference of the mount unit 100.

To remove the HMD 1, the user performs the operation A to enlarge the circumference of the mount unit 100. The user can also enlarge the circumference of the mount unit 100 by holding the first housing 104 with both hands and pushing the second housing 105 using the back of the head.

In this way, the user can change the circumferential length of the mount unit 100 by performing an intuitive operation, without performing a predetermined operation such as operating a release button.

The mount unit 100 includes the dial-type operation member 116. When the operation member 116 is rotated by torque exceeding the holding torque of the torque limiter 115

(hereinafter referred to as "operation B"), the pinion 114 rotates. The pinion 114 thereby generates a force for moving the band portions 108L and 108R, so that the circumference of the mount unit 100 slightly changes. In the present exemplary embodiment, the circumference of the mount unit 100 is reduced when the operation member 116 is rotated clockwise and enlarged when the operation member 116 is rotated counterclockwise. In this way, performing the operation B using the operation member 116 makes it easier for the user to make fine adjustment intuitively than performing the operation A.

As described above, by performing the operation A and the operation B with a force exceeding the holding torque of the torque limiter 115, the user can make rough adjustment and fine adjustment of the circumference of the mount unit 100 in the both directions (the circumference enlargement direction $D_1$ and the circumference reduction direction $D_2$) by an intuitive operation.

In the present exemplary embodiment, the torque limiter 115 generates the holding force in the circumference enlargement direction $D_1$ and the circumference reduction direction $D_2$ of the mount unit 100. To hold the HMD 1 on the head, enlargement of the circumference of the mount unit 100 can be prevented by the holding force generated in the circumference enlargement direction $D_1$. Therefore, the torque limiter 115 may have a one-way function of not generating the holding force in the circumference reduction direction $D_2$, In this case, the mounting/demounting operation flow can be simplified because the holding force in the circumference reduction direction $D_2$ of the mount unit 100 is weak. Further, the holding torque of the torque limiter 115 may be set to be variable.

Next, a second exemplary embodiment will be described with reference to FIG. 7. In the first exemplary embodiment, the torque limiter 115 is used as a circumference holding unit in the present disclosure, whereas in the second exemplary embodiment, a friction plate will be used as the circumference holding unit. In the following, components similar to those of the HMD 1 according to the first exemplary embodiment will be provided with the same reference numerals as those thereof and will not be described.

Figure 7:
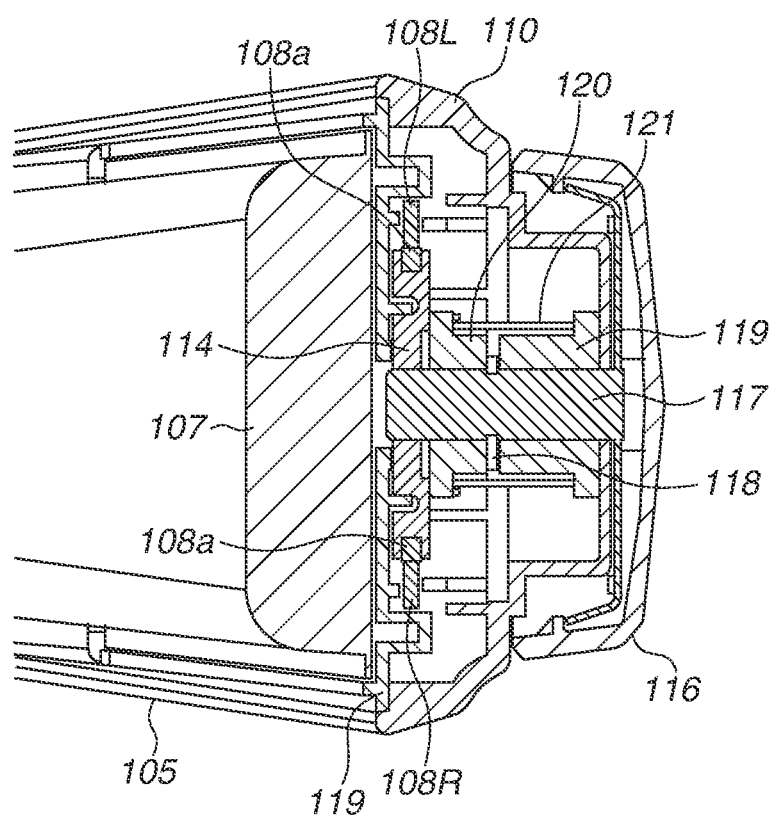
FIG. 7 is a diagram illustrating a cross-sectional configuration of a mount unit of an HMD according to one or more aspects of the present disclosure.

FIG. 7 is a cross-sectional diagram corresponding to that illustrated in FIG. 6. The cross-sectional configuration in FIG. 7 differs from that of FIG. 6 in that friction plates 119 and 120 and a spring 121, instead of the torque limiter 115, generate holding torque using a static frictional force.

The friction plate 119 is pressed against an outer portion 110 by an urging force of the spring 121. The friction plate 119 may be rotatable about a pinion shaft 117 or may be connected thereto in the rotation direction. The friction plate 120 is pressed against a pinion 114 by the urging force of the spring 121. The friction plate 120 may be rotatable about the pinion shaft 117 or may be connected thereto in the rotation direction, A ring 118 for retention is attached to the pinion shaft 117 between the friction plates 119 and 120.

In the second exemplary embodiment, a holding force for a change in the circumference of a mount unit 100 can be generated as in the first exemplary embodiment.

The counterpart component against which the friction plates 119 and 120 are pressed by the urging force of the spring 121 may be an inner portion 109, a band portion 108L, or a band portion 108R as long as a static frictional force as the holding force for a change in the circumference of the mount unit 100 is generated. Further, the friction plates 119 and 120 need not be coaxial with the pinion shaft 117 if the static frictional force as the holding force for a change in the circumference of the mount unit 100 is generated.

As described above, to hold the HMD 1 on the head of the user, generating an appropriate holding force in the circumference enlargement direction $D_1$ is sufficient, and the holding force in the circumference reduction direction $D_2$ may be weak, A configuration example in which the holding force in the circumference reduction direction $D_2$ is weaker than the holding force in the circumference enlargement direction $D_1$ will be described as a third exemplary embodiment. In the following, components similar to those of the HMD 1 according to the first exemplary embodiment will be provided with the same reference numerals as those thereof and will not be described.

Figure 8:
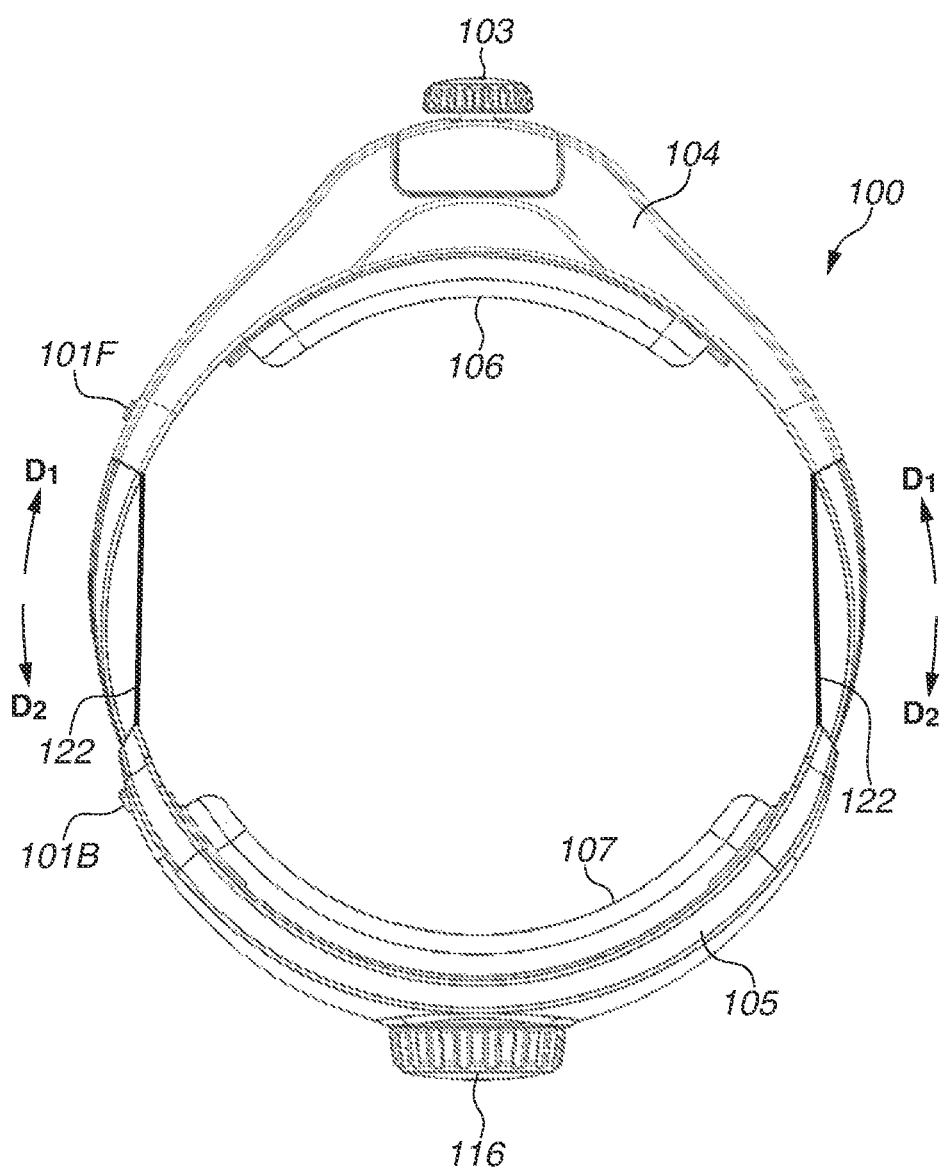
FIG. 8 is a plan view of a mount unit of an HMD according to a third exemplary embodiment.

FIG. 8 is a plan view of a mount unit 100 according to the third exemplary embodiment. On each of right and left inner sides of the mount unit 100, an elastic member 122 is attached to link a first housing 104 and a second housing 105, The elastic member 122 causes an elastic force to act in the circumference enlargement direction $D_1$ of the mount unit 100. In other words, in addition to the frictional force of a torque limiter 115 or the frictional force of friction plates 119 and 120 and a spring 121, the elastic force of the elastic member 122 acts as the holding force in the circumference enlargement direction $D_1$. The holding force in the circumference reduction direction $D_2$ is thereby caused to be weaker than the holding force in the circumference enlargement direction $D_1$. The elastic member 122 is formed of, for example, a rubber member or a spring.

The configuration of the elastic member 122 is not limited to the configuration in FIG. 8. For example, a spiral spring serving as an elastic member which spirals in the rotation direction may be connected between an inner portion 109 and a pinion 114.

Figure 9A:
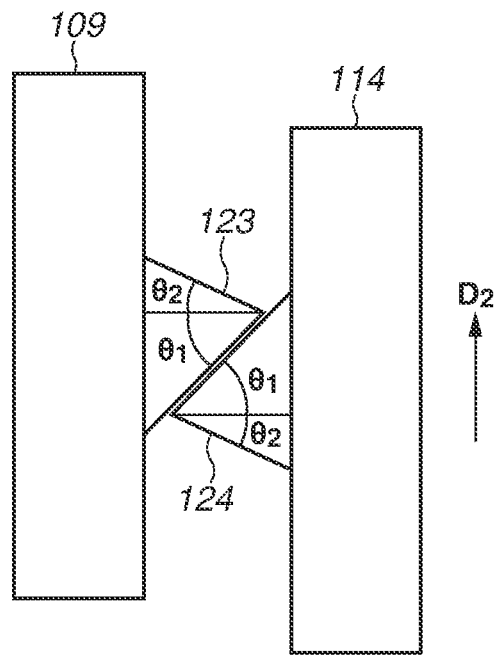
FIGS. 9A and 9B are schematic diagrams illustrating a configuration of engagement between an inner portion and a pinion of the HMD according to one or more aspects of the present disclosure.
Figure 9B:
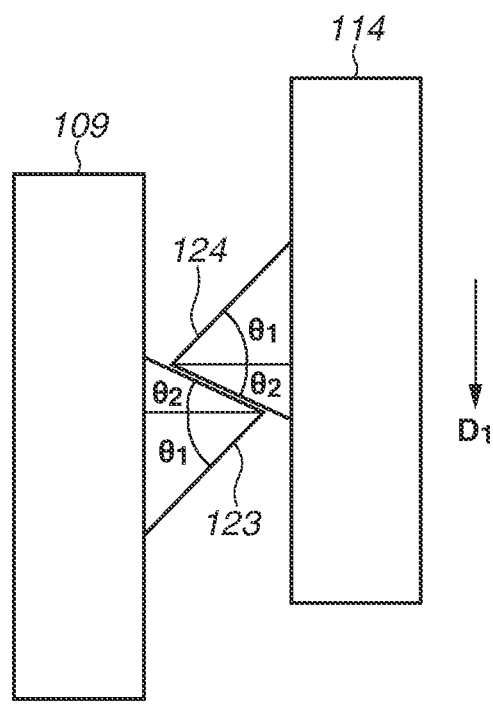

FIGS. 9A and 9B are schematic diagrams illustrating a structure of engagement between the inner portion 109 and the pinion 114 as viewed from a rotation-shaft direction of the pinion 114. FIG. 9A illustrates a state where the pinion 114 rotates in the circumference reduction direction $D_2$ of the mount unit 100. FIG. 9B illustrates a state where the pinion 114 rotates in the circumference enlargement direction $D_1$ of the mount unit 100. The pinion 114 is provided with, for example, a plurality of protrusions 124 protruding in the radial direction with respect to a rotation axis. The protrusion 124 has a slope angle $\theta_1$ in the circumference reduction direction $D_2$ and a slope angle $\theta_2$ in the circumference enlargement direction $D_1$ ($\theta_1 > \theta_2$). The inner portion 109 is provided with, for example, a plurality of protrusions 123 corresponding to the protrusions 124. The protrusion 123 has a slope angle $\theta_1$ in the circumference enlargement direction $D_1$ and a slope angle $\theta_2$ in the circumference reduction direction $D_2$. An elastic member (not illustrated) provided in the pinion 114 causes a slope of the protrusion 124 to abut onto a slope of the protrusion 123, As illustrated in FIG. 9A, the pinion 114 is rotated such that the engagement of the protrusions 123 and 124 on the respective surfaces at the slope angle $\theta_1$ is released in the circumference reduction direction $D_2$ of the mount unit 100. In contrast, as illustrated in FIG. 9B, the pinion 114 is rotated such that the engagement of the protrusions 123 and 124 on the respective surfaces at the slope angle $\theta_2$ is released in the circumference enlargement direction $D_1$ of the mount unit 100. Because the relationship between the slope angles $\theta_1$ and $\theta_2$ is $\theta_1 > \theta_2$, the holding force in the circumference reduction direction $D_2$ is weaker than the holding force in the circumference enlargement direction $D_1$.

Instead of each of the inner portion 109 and the pinion 114, each of the band portions 108L and 108R may have the shape having different slope angles.

The configuration example in which the holding force in the circumference reduction direction $D_2$ is weaker than the holding force in the circumference enlargement direction $D_1$ is not limited to the configuration illustrated in FIG. 8 and FIG. 9, For example, there may be adopted such a configuration that the holding force in the circumference reduction direction $D_2$ is made weaker than the holding force in the circumference enlargement direction $D_1$ by a component shape instead of using the elastic member.

The exemplary embodiments of the present disclosure that have been described above. The exemplary embodiments, however, are only examples in which the present disclosure is embodied, and shall not be construed as limiting the technical range of the present disclosure. In other words, the present disclosure can be implemented in various forms without departing from the technical ideas or main features thereof.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-014022, filed Jan. 30, 2020, which is hereby incorporated by reference herein in its entirety.

What is claimed is:

1. A head mounted device comprising:
a ring-shaped mount unit for mounting the head mounted device on a head of a user, the ring-shaped mount unit including a first housing having a first band portion and a second band portion and a second housing having a pinion to be engaged with a rack of the first band portion and a rack of the second band portion, and the ring-shaped mount unit being formed in a ring shape that enables enlargement and reduction of a circumference thereof by engagement of the racks with the pinion,
wherein the pinion has a slope angle greater in a circumference reduction direction of the ring-shaped mount unit than in a circumference enlargement direction of the ring-shaped mount unit.

2. The head mounted device according to claim 1, further comprising a circumference holding unit configured to generate a holding force at least in the a circumference enlargement direction of the ring-shaped mount unit.

3. The head mounted device according to claim 2, wherein the circumference holding unit generates the holding force using a frictional force.

4. The head mounted device according to claim 2, wherein the circumference holding unit is a torque limiter.

5. The head mounted device according to claim 2, wherein a holding force in the circumference reduction direction is weaker than the holding force in the circumference enlargement direction.

6. The head mounted device according to claim 2, wherein the circumference holding unit includes an elastic member, and generates the holding force using the elastic member.

7. The head mounted device according to claim 1, further comprising an operation member connected to the pinion.

8. The head mounted device according to claim 1, further comprising a display unit configured to display an image to a user wearing the head mounted device.

* * * * *